(12) United States Patent
Du et al.

(10) Patent No.: US 11,012,000 B2
(45) Date of Patent: May 18, 2021

(54) SWITCHING TYPE CONTROL METHOD BASED ON DOUBLE LOOP PREDICTIVE CONTROL

(71) Applicant: SOUTH CHINA UNIVERSITY OF TECHNOLOGY, Guangdong (CN)

(72) Inventors: Guiping Du, Guangdong (CN); Jiajian Li, Guangdong (CN); Zhifei Liu, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 246 days.

(21) Appl. No.: 16/089,383

(22) PCT Filed: Dec. 30, 2017

(86) PCT No.: PCT/CN2017/120375
§ 371 (c)(1),
(2) Date: Sep. 28, 2018

(87) PCT Pub. No.: WO2019/019555
PCT Pub. Date: Jan. 31, 2019

(65) Prior Publication Data
US 2020/0304040 A1    Sep. 24, 2020

(30) Foreign Application Priority Data

Jul. 25, 2017 (CN) .......................... 201710614643.9

(51) Int. Cl.
*H02M 7/5387* (2007.01)
*H02M 1/12* (2006.01)

(52) U.S. Cl.
CPC .......... *H02M 7/5387* (2013.01); *H02M 1/12* (2013.01); *H02M 7/53873* (2013.01); *H02M 2001/123* (2013.01)

(58) Field of Classification Search
CPC ................ H02M 3/157; H02M 3/156; H02M 2001/0012; H02M 2001/003;
(Continued)

(56) References Cited

U.S. PATENT DOCUMENTS 5,250,887 A * 10/1993 Kurosawa ............ G05B 13/023
318/561
2005/0221514 A1* 10/2005 Pasadyn ................ G05B 17/02
438/14
(Continued)

FOREIGN PATENT DOCUMENTS

CN          102891615          1/2013
CN          103326609          9/2013
(Continued)

OTHER PUBLICATIONS

Wei Xie et al.; Finite-Control-Set Model Predictive Torque Control With a Deadbeat Solution for PMSM Drives; IEEE Transactions on Industrial Electronics, vol. 62, No. 9, Sep. 2015 (Year: 2015).*
(Continued)

*Primary Examiner* — Gustavo A Rosario-Benitez
(74) *Attorney, Agent, or Firm* — JCIPRNET

(57) ABSTRACT

A switching type control method based on a double loop predictive control is provided. A deadbeat control is adopted by the outer loop control. The switching type control method is adopted by the inner loop control. When the system is in the steady state, the deadbeat control by an inner loop is adopted to ensure the steady state accuracy of the system and to achieve the fixed switching frequency. When the system is in the transient state, it is switched to the finite control set model predictive control by the inner loop to ensure the rapid transition of the system to the steady state.

5 Claims, 4 Drawing Sheets

(58) Field of Classification Search
CPC .......... H02M 7/5387; H02M 7/53873; H02M 7/53871; H02M 7/53876; H02M 7/42; H02M 7/44; H02M 7/48; H02M 1/00
See application file for complete search history.

(56) References Cited

U.S. PATENT DOCUMENTS

| | | | |
|---|---|---|---|
| 2008/0164859 A1* | 7/2008 | Peng | H02M 3/157 323/318 |
| 2010/0268353 A1* | 10/2010 | Crisalle | G05B 13/048 700/29 |
| 2015/0299233 A1* | 10/2015 | Lippard | C07F 13/005 514/185 |
| 2018/0054139 A1* | 2/2018 | Huang | H02M 1/14 |

FOREIGN PATENT DOCUMENTS

| | | |
|---|---|---|
| CN | 105391285 | 3/2016 |
| CN | 106911147 | 6/2017 |
| EP | 2908424 | 8/2015 |

OTHER PUBLICATIONS

Fard et al., "Analysis of a Modular Multilevel Inverter Under the Predicted Current Control Based on Finite-Control-Set Strategy", 2013 3rd International Conference on Electric Power and Energy Conversion Systems, Oct. 2013, pp. 1-6.
"International Search Report (Form PCT/ISA/210)", dated Apr. 4, 2018, pp. 1-5.

* cited by examiner

SWITCHING TYPE CONTROL METHOD BASED ON DOUBLE LOOP PREDICTIVE CONTROL

CROSS-REFERENCE TO RELATED APPLICATION

This application is a 371 application of an international PCT application serial no. PCT/CN2017/120375, filed on Dec. 30, 2017, which claims priority to and the benefit of China Patent Application No. 201710614643.9, filed on Jul. 25, 2017. The entirety of each of the abovementioned patent applications is hereby incorporated by reference herein and made a part of this specification.

TECHNICAL FIELD

The invention relates to the technologies of power electronic converter and industrial control, in particular to a switching type control method based on double loop predictive control, which belongs to the technical field of power electronic converter.

BACKGROUND

With the gradual maturity and popularization of widebandgap power devices such as silicon carbide and so on, the switching frequency of power converters is constantly increasing, and the corresponding control methods have become the mainstream of research. In the traditional double loop control, the outer loop mainly has Proportional-Integral (PI) control and synovial control, but its dynamic performance is not high. The performance of the system (the system of the present invention refers to the implementation object of the control method, generally the power electronic converter, and in the present invention, refers to the single-phase voltage inverter) is closely related to the outer loop control and inner loop control. How to improve the overall performance of the system through the outer loop control is an area worthy of further study.

The currently used predictive control methods are deadbeat control and finite control set model predictive control. The deadbeat control can achieve the tracking of the reference quantity by the controlled quantity in one control period. It has excellent steady state performance and can achieve a fixed switching frequency, but the presence of the modulation unit limits the dynamic performance of the deadbeat control. The finite control set model predictive control directly utilizes the discrete characteristic of the converter and the characteristic of limited switching state. It has the advantages of no need for modulator, fast dynamic response and easy addition of nonlinear constraints. However, the switching frequency is not fixed, which makes the filter design difficult and control performance to be subjected to certain limitations. How to combine the advantages of the two control methods to achieve reasonable switching of the two control strategies has great practical significance.

SUMMARY OF THE INVENTION

In view of the deficiencies of the existing control strategy, the object of the present invention is to provide a switching type control method based on double loop predictive control. The method is based on double loop predictive control. A deadbeat control is adopted by an outer loop control to improve the overall performance of a system. A switching control method is adopted by an inner loop control: when the system is in a steady state, the deadbeat control is adopted to ensure the accuracy of the steady state of the system and to achieve a fixed switching frequency; and when the system is in a transient state, it is switched to a finite control set model predictive control to ensures a rapid transition of the system to the steady state.

The object of the present invention can be achieved by one of the following technical solutions.

A switching type control method based on double loop predictive control, mainly comprises steps of:

(S1) Setting out a state equation of a discrete time of a system (the system of the present invention refers to the implementation object of the control method, generally the power electronic converter, and in the present embodiment), and discretizing the state equation.

(S2) Measuring a state variable, a controlling input variable, a controlled output variable and a disturbance variable of the system.

(S3) Adopting a deadbeat control by a voltage outer loop control to calculate a current inner loop reference value.

(S4) Defining a switching function to determine which state the system is in.

(S5) According to the determining condition of step (S4), when the system is determined to be in a steady state, adopting the deadbeat control by an inner loop; when the system is determined to be in a transient state, adopting a finite control set model predictive control by the inner loop.

Furthermore, in (S1), according to Kirchhoff Voltage Law (KVL) and Kirchhoff Current Law (KCL), setting out the state equation of the discrete time of the system:

$$\begin{cases} \dfrac{d}{dt}\begin{bmatrix} V_0(k) \\ i_L(k) \end{bmatrix} = \begin{bmatrix} 0 & \dfrac{1}{C} \\ -\dfrac{1}{L} & 0 \end{bmatrix}\begin{bmatrix} V_0(k) \\ i_L(k) \end{bmatrix} + \begin{bmatrix} 0 & -\dfrac{1}{C} \\ \dfrac{1}{L} & 0 \end{bmatrix}\begin{bmatrix} V_{in}(k) \\ i_0(k) \end{bmatrix}, \\ y_c(k) = \begin{bmatrix} 1 & 0 \end{bmatrix}\begin{bmatrix} V_0(k) \\ i_L(k) \end{bmatrix} \end{cases}$$

wherein d[ ]/dt represents a differential value of the state variable; L and C respectively represent a filter inductance value and a filter capacitance value of a single-phase voltage inverter; $V_0(k)$ and $i_L(k)$ respectively represent an output voltage value and an filter inductor current value of the inverter at a sampling time k, and act as the state variables of the system; $V_{in}(k)$ represents a voltage value at a AC side of an inverter bridge at the sampling time k, and acts as the disturbance variable of the system; $i_0(k)$ represents an output current value at the sampling time k, and acts as the disturbance variable of the system; and $y_c(k)$ represents a controlled output variable value at the sampling time k; setting a sampling period of the system to be T, discretize the state equation according to the forward Euler method and obtain:

$$\begin{cases} \begin{bmatrix} \dfrac{V_0(k+1) - V_0(k)}{T} \\ \dfrac{i_L(k+1) - i_L(k)}{T} \end{bmatrix} = \begin{bmatrix} 0 & \dfrac{1}{C} \\ -\dfrac{1}{L} & 0 \end{bmatrix}\begin{bmatrix} V_0(k) \\ i_L(k) \end{bmatrix} + \begin{bmatrix} 0 & -\dfrac{1}{C} \\ \dfrac{1}{L} & 0 \end{bmatrix}\begin{bmatrix} V_{in}(k) \\ i_0(k) \end{bmatrix}, \\ y_c(k) = \begin{bmatrix} 1 & 0 \end{bmatrix}\begin{bmatrix} V_0(k) \\ i_L(k) \end{bmatrix} \end{cases}$$

wherein $V_0(k+1)$, $i_L(k+1)$ respectively represent the output voltage value and the filter inductor current value at a sampling time k+1, and act as the state variables of the system; $V_0(k)$ and $i_L(k)$ respectively represent the output voltage value and the filter inductor current value of the inverter at the sampling time k, and act as the state variables of the system; $V_{in}(k)$ represents the voltage value at the AC side of the inverter bridge at the sampling time k, and acts as the disturbance variable of the system; $i_0(k)$ represents the output current value at the sampling time k, and acts as the disturbance variable of the system; $y_c(k)$ represents the controlled output variable value at the sampling time k; L and C respectively represent the filter inductance value and the filter capacitance value of the single-phase voltage inverter; and T is the sampling period of the system.

Furthermore, wherein in (S2), the state variables $V_0(k)$, $i_L(k)$, the controlling input variable $V_r(k)$, the controlled output variable $y_c(k)$ and the disturbance variables $V_{in}(k)$, $i_0(k)$ of the system are measured.

Furthermore, in (S3), adopting the deadbeat control by the outer loop control to improve the overall performance of the system; according to (S1), a discrete KCL equation of the system is obtained:

$$\frac{C}{T}[V_0(k+1) - V_0(k)] = i_L(k) - i_0(k),$$

and in combination with the principle of the deadbeat control: $V_r(k+1) - V_0(k+1) = 0$, wherein $V_0(k+1)$ represents the output voltage value at the sampling time k+1 and $V_r(k+1)$ represents a reference voltage value corresponding to the $V_0(k+1)$ at the sampling time k+1, then a calculation formula of a current inner loop control reference value is obtained:

$$i_r(k) = \frac{C}{T}[V_r(k+1) - V_0(k)] + i_0(k),$$

wherein $i_r(k)$ represents a reference current value of the filter inductor current $i_L(k)$ at the sampling time k; $V_r(k+1)$ represents the reference voltage value corresponding to the $V_0(k+1)$ at the sampling time k+1; $V_0(k)$ represents the output voltage value at the sampling time k; $i_0(k)$ represents the output current value at the sampling time k; C represents the filter capacitance value; and T represents the sampling period of the system.

Furthermore, in (S4), a switching function $J_{sw}(k) = |(V_r(k) - V_0(k))^2 - (V_r(k-1) - V_0(k-1))^2|$ is defined, wherein $J_{sw}(k)$ represents a switching function value at the sampling time k; $V_0(k)$ represents the output voltage value at the sampling time k; $V_r(k)$ represents the reference voltage value corresponding to the $V_0(k)$ at the sampling time k; $V_0(k-1)$ represents the output voltage value at a sampling time k-1; and $V_r(k-1)$ represents the reference voltage value corresponding to the $V_0(k-1)$ at the sampling time k-1; setting the switching point threshold to be $e_{max}$, and comparing $J_{sw}(k)$ with $e_{max}$; when $J_{sw}(k) \geq e_{max}$, the system is determined to be in the transient state; and when $J_{sw}(k) < e_{max}$, the system is determined to be in the steady state.

Furthermore, in (S5), according to the determining condition of (S4), when the system is determined to be in the steady state, the deadbeat control is adopted by the inner loop control to reduce the steady state error of the system and to achieve a fixed switching frequency; and when the system is determined to be in the transient state, the finite control set model predictive control is adopted by the inner loop control to ensure a rapid transition of the system to the steady state.

Compared with the prior art, the beneficial effects of the present invention are:

1. The deadbeat control is adopted by the outer loop to greatly improve the overall performance of the system.

2. When the system is in the steady state, the steady state error of the system can be reduced. 3. When the system is in the transient state, it can ensure the rapid transition of the system from transient state to the steady state. 4. The fixed switching frequency can be achieved when the system is in the steady state.

DETAILED DESCRIPTION OF THE PREFERRED EMBODIMENT

The present invention is further described with reference to the accompanying drawings and specific embodiments, but the implementation and protection of the present invention is not limited thereto.

Figure 1:
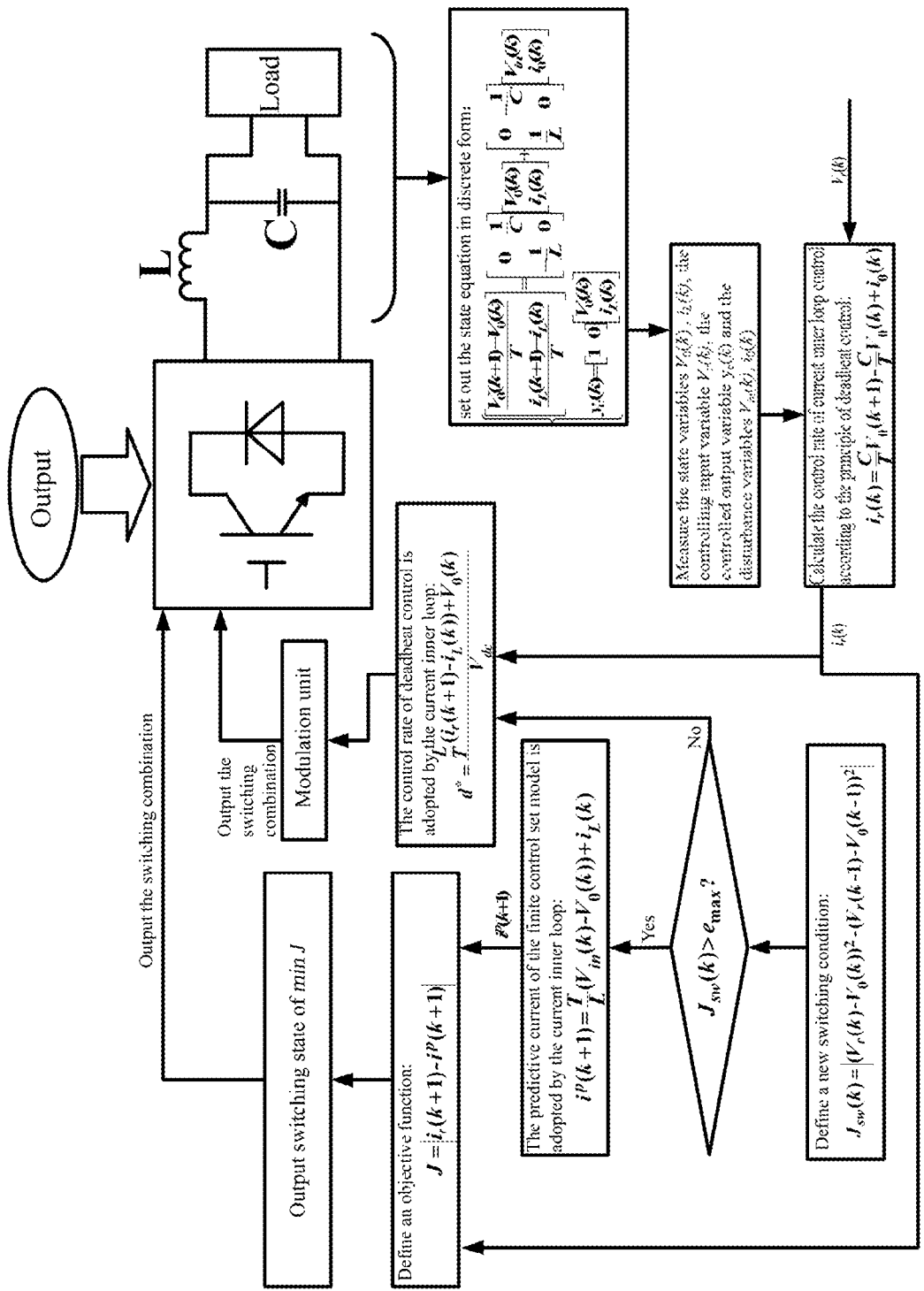
FIG. 1 is a schematic diagram of a switching type control method based on double loop predictive control according to the present invention.

FIG. 1 shows a switching type control method based on double loop predictive control.

A single-phase voltage type inverter will be described as an example below. The specific steps are as follows.

(S1) According to Kirchhoff Voltage Law (KVL) and Kirchhoff Current Law (KCL), setting out a state equation of a discrete time of a system (the system of the present invention refers to the implementation object of the control method, generally the power electronic converter, and in the present embodiment, refers to the single-phase voltage inverter):

$$\begin{cases} \frac{d}{dt}\begin{bmatrix} V_0(k) \\ i_L(k) \end{bmatrix} = \begin{bmatrix} 0 & \frac{1}{C} \\ -\frac{1}{L} & 0 \end{bmatrix}\begin{bmatrix} V_0(k) \\ i_L(k) \end{bmatrix} + \begin{bmatrix} 0 & -\frac{1}{C} \\ \frac{1}{L} & 0 \end{bmatrix}\begin{bmatrix} V_{in}(k) \\ i_0(k) \end{bmatrix} \\ y_c(k) = \begin{bmatrix} 1 & 0 \end{bmatrix}\begin{bmatrix} V_0(k) \\ i_L(k) \end{bmatrix} \end{cases} \quad (1)$$

wherein d[ ]/dt represents a differential value of a state variable; L and C respectively represent a filter inductance value and a filter capacitance value of a single-phase voltage inverter; $V_0(k)$ and $i_L(k)$ respectively represent an output voltage value and an filter inductor current value of the inverter at a sampling time k, and act as the state variables of the system; $V_{in}(k)$ represents a voltage value at a AC side of an inverter bridge at the sampling time k, and acts as a disturbance variable of the system; $i_0(k)$ represents an output current value at the sampling time k, and acts as the disturbance variable of the system; and $y_c(k)$ represents a controlled output variable value at the sampling time k.

Setting a sampling period of the system to be T, according to the forward Euler method, discretizing the differential term in the state equation and obtaining the state equation of the discretized system:

$$\begin{cases} \begin{bmatrix} \frac{V_0(k+1)-V_0(k)}{T} \\ \frac{i_L(k+1)-i_L(k)}{T} \end{bmatrix} = \begin{bmatrix} 0 & \frac{1}{C} \\ -\frac{1}{L} & 0 \end{bmatrix} \begin{bmatrix} V_0(k) \\ i_L(k) \end{bmatrix} + \begin{bmatrix} 0 & -\frac{1}{C} \\ \frac{1}{L} & 0 \end{bmatrix} \begin{bmatrix} V_{in}(k) \\ i_0(k) \end{bmatrix} \\ y_c(k) = \begin{bmatrix} 1 & 0 \end{bmatrix} \begin{bmatrix} V_0(k) \\ i_L(k) \end{bmatrix} \end{cases} \quad (2)$$

wherein $V_0(k+1)$, $i_L(k+1)$ respectively represent the output voltage value and the filter inductor current value at a sampling time k+1, and act as the state variables of the system; $V_0(k)$, $i_L(k)$ respectively represent the output voltage value and the filter inductor current value of the inverter at the sampling time k, and act as the state variables of the system; $V_{in}(k)$ represents the voltage value at the AC side of the inverter bridge at the sampling time k, and acts as the disturbance variable of the system; $i_0(k)$ represents the output current value at the sampling time k, and acts as the disturbance variable of the system; $y_c(k)$ represents the controlled output variable value at the sampling time k; L and C respectively represent the filter inductance value and the filter capacitance value of the single-phase voltage inverter; and T is the sampling period of the system.

(S2) Measuring the state variables $V_0(k)$, $i_L(k)$, the controlling input variable $V_r(k)$, the controlled output variable $y_c(k)$ and the disturbance variables $V_{in}(k)$, $i_0(k)$ of the system.

(S3) In order to improve the overall performance of the system, the deadbeat control is adopted by the outer loop control. According to (S1), a discrete KCL equation of the system is obtained:

$$\frac{C}{T}[V_0(k+1) - V_0(k)] = i_L(k) - i_0(k) \quad (3)$$

according to the principle of the deadbeat control:

$$V_r(k+1) - V_0(k+1) = 0 \quad (4)$$

wherein $V_0(k+1)$ represents the output voltage value at the sampling time k+1; and $V_r(k+1)$ represents a reference voltage value corresponding to the $V_0(k+1)$ at the sampling time k+1.

A calculation formula of a current inner loop control reference value is obtained by combining equations (3) and (4):

$$i_r(k) = \frac{C}{T}[V_r(k+1) - V_0(k)] + i_0(k) \quad (5)$$

wherein $i_r(k)$ represents a reference current value of the filter inductor current $i_L(k)$ at the sampling time k; $V_r(k+1)$ represents the reference voltage value corresponding to the $V_0(k+1)$ at the sampling time k+1; $V_0(k)$ represents the output voltage value at the sampling time k; $i_0(k)$ represents the output current value at the sampling time k; C represents the filter capacitance value; and T represents the sampling period of the system.

The current value calculated and obtained by the equation (5) is input as a reference signal into the inner loop controller.

(S4) To enhance the sensitivity and effectiveness of the switching point, we define the following switching function:

$$J_{sw}(k) = |(V_r(k) - V_0(k))^2 - (V_r(k-1) - V_0(k-1))^2| \quad (6)$$

wherein: $J_{sw}(k)$ represents a switching function value at the sampling time k; $V_0(k)$ represents the output voltage value at the sampling time k; $V_r(k)$ represents the reference voltage value corresponding to the $V_0(k)$ at the sampling time k; $V_0(k-1)$ represents the output voltage value at a sampling time k-1; and $V_r(k-1)$ represents the reference voltage value corresponding to the $V_0(k-1)$ at the sampling time k-1.

According to the requirements of the system, setting the switching point threshold to be $e_{max}$, and comparing $J_{sw}(k)$ with $e_{max}$. When $J_{sw}(k) > e_{max}$, the system is determined to be in the transient state; and when $J_{sw}(k) < e_{max}$, the system is determined to be in the steady state.

(S5) According to the determined result of (S4), select the inner loop control method which is applied to different cases.

When $J_{sw}(k) < e_{max}$, it is determined that the system has entered the steady state, and the deadbeat control is adopted by the current inner loop control. At this point, according to equation (2), a KVL equation of the system in discrete form can be obtained:

$$\frac{L}{T}(i_L(k+1) - i_L(k)) = V_{in}(k) - V_0(k) \quad (7)$$

$V_{in}(k)$ has another expression:

$$V_{in}(k) = d^* V_{dc} \quad (8)$$

wherein $V_{in}(k)$ represents the voltage value at the AC side of the inverter bridge at the sampling time k; $V_{dc}$ represents the voltage value at a DC side of the inverter bridge; d* represents a modulation signal.

According to the principle of deadbeat control:

$$i_r(k+1) - i_L(k+1) = 0 \quad (9)$$

wherein: $i_L(k+1)$ represents the filter inductor current value at the sampling time k+1; and $i_r(k+1)$ represents the reference current value corresponding to the $i_L(k+1)$ at the sampling time k+1.

By combining equations (7), (8) and (9), the control rate of the current inner loop control, i.e., the modulated signal can be obtained:

$$d^* = \frac{\frac{L}{T}(i_r(k+1) - i_L(k)) + V_0(k)}{V_{dc}} \quad (10)$$

The modulation signal is input into a modulation unit for comparison with a triangular wave, and the switch combination is calculated and applied to the inverter to control the output voltage.

When $J_{sw}(k) > e_{max}$, the system is determined to be in the transient state. At this point, the current inner loop control is switched to the finite control set model predictive control. At this time, the discretized KVL equation of the system is as shown in equation (7), and the equation (7) can be rewritten to obtain the predictive current calculation formula:

$$i^P(k+1) = \frac{T}{L}(V_{in}(k) - V_0(k)) + i_L(k) \quad (11)$$

Power electronic converters achieve control objectives by controlling the turn-on and turn-off of controllable switching transistors, and each switch has only two states: on and off, and all switching functions are combined by these two states. Define the switching state as follows:

$$S_i = \begin{cases} 1, & \text{An upper bridge arm is conducted} \\ 0, & \text{A lower bridge arm is conducted} \end{cases} \quad (12)$$

$i$ represents the serial number of the bridge arms

The relationship between the alternative voltage vector $V_{in}(k)$ and the switching combination is shown in Table 1 ($V_{dc}$ is the voltage value at the DC side of the inverter).

TABLE 1

The relationship between the alternative voltage vector $V_{in}(k)$ and the switching combination

| | switching combination | | | |
|---|---|---|---|---|
| | 00 | 01 | 11 | 10 |
| alternative voltage $V_{in}(k)$ | 0 | $-V_{dc}$ | 0 | $V_{dc}$ |

Substitute the alternative voltage vector into equation (11) and obtain different predictive current values. Define an objective function as follows:

$$J = |i_r(k+1) - i^P(k+1)| \quad (13)$$

wherein $i_r(k+1)$ is the reference current value at the time k+1, $i^P(k+1)$ represents the predictive current value at the time k+1; J represents the objective function value.

Substitute different predictive current values into equation (13), and apply the corresponding switch combination which minimizes the J value to the inverter.

Figure 2:
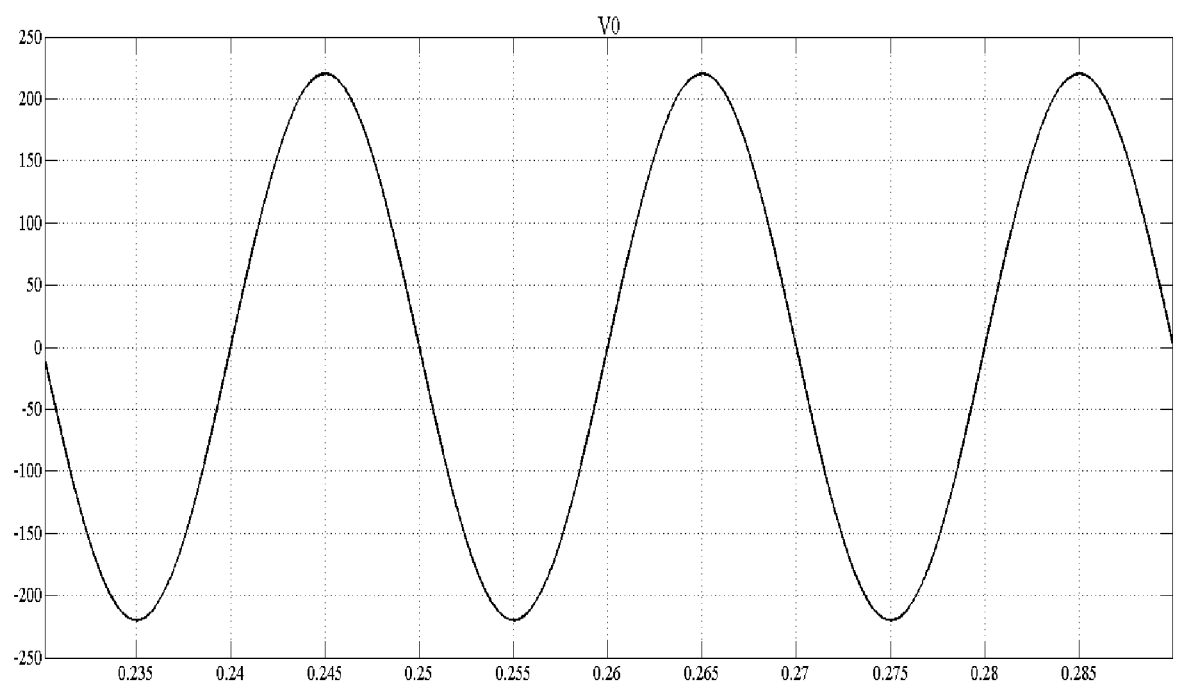
FIG. 2 is a graph showing the effect of a steady state output voltage waveform simulated by MATLAB to which the present invention is applied.
Figure 3:
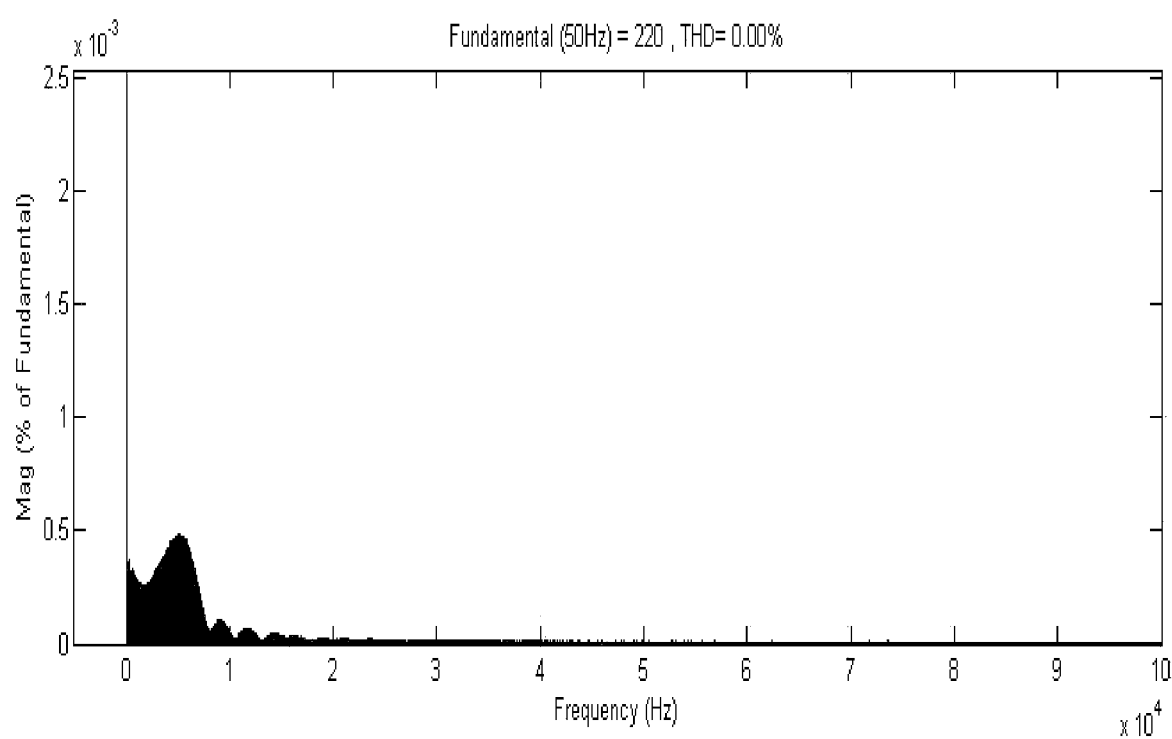
FIG. 3 is a graph showing the effect of THD of a steady state output voltage simulated by MATLAB to which the present invention is applied.
Figure 4:
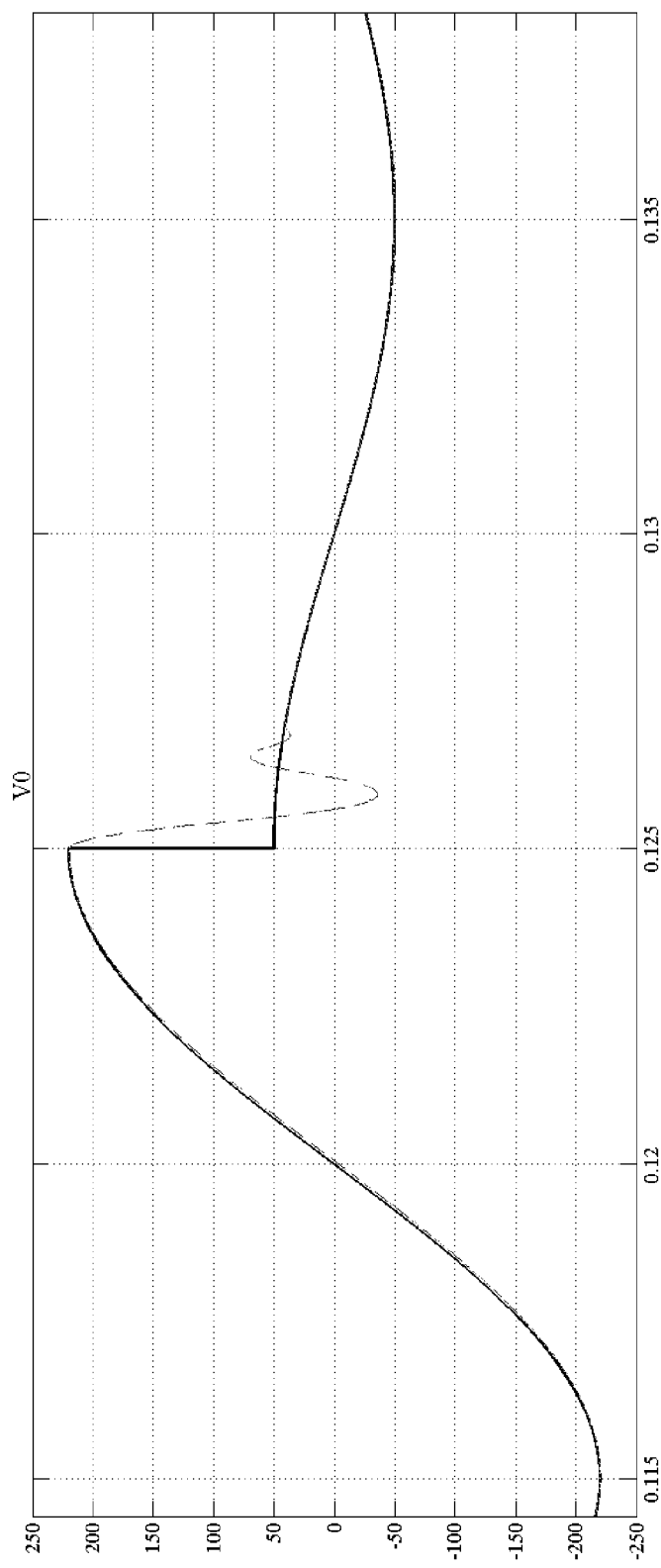
FIG. 4 is a graph showing the effect of an output voltage dynamic response, when a reference voltage is changing, simulated by MATLAB to which the present invention is applied.

FIG. 2, FIG. 3 and FIG. 4 are graphs showing the effect by MATLAB simulation to which the present invention is applied. FIG. 2 is a graph (the abscissa represents time and the ordinate represents output voltage value) showing the effect of a steady state output voltage waveform simulated by MATLAB to which the present invention is applied. FIG. 3 is a graph (the abscissa represents the frequency value, and the ordinate represents the voltage value under the corresponding frequency value after Fourier decomposition) showing the effect of THD of a steady state output voltage simulated by MATLAB to which the present invention is applied. FIG. 4 is a graph (the abscissa represents time, and the ordinate represents output voltage value; the solid curve and the dashed curve represent reference voltage and actual output voltage, respectively, and except for the middle small part, the rest are very close) showing the effect of an output voltage dynamic response, when a reference voltage is changing, simulated by MATLAB to which the present invention is applied.

The specific simulation parameters are as shown in Table 2.

TABLE 2

| simulation parameters | |
|---|---|
| simulation parameters | parameters |
| voltage value $V_{dc}$ at the DC side | 380 V |
| filter inductance L | 0.7 mH |
| filter capacitance C | 0.5 mF |
| rated load R | 25 Ω |
| sampling frequency | 20 kHz |

The above algorithm is written into the FUNTION module of MATLAB through C language, and the sampled variable value is input into the FUNTION module, and the switching combination at current time is output by calculation and applied to the switching converter.

As shown in FIG. 2 and FIG. 3, the output voltage waveform is good and the voltage distortion rate is low when in the steady state. According to FIG. 4, when the reference voltage value changes, the finite control set model predictive control makes the system transition to the steady state more rapidly, which has good dynamic performance.

Those people skilled in the art can make various modifications or additions to the present specific embodiments or replace them in a similar manner without departing from the spirit and scope of the invention, but these modifications all fall within the protection scope of the present invention. Therefore, the technical scope of the present invention is not limited to the above embodiments.

What is claimed:

1. A switching type control method based on a double loop predictive control, the switching type control method comprises steps of:
   (S1) setting out a state equation of a discrete time of a system, and discretizing the state equation;
   (S2) measuring a state variable, a controlling input variable, a controlled output variable and a disturbance variable of the system;
   (S3) adopting a deadbeat control by a voltage outer loop control to calculate a current inner loop control reference value;
   (S4) defining a switching function to determine which state the system is in, wherein in (S4), a switching function $J_{sw}(k) = |(V_r(k) \; V_0(k))^2 - (V_r(k-1) - V_0(k-1))^2|$ is defined, wherein $J_{sw}(k)$ represents a switching function value at a sampling time k; $V_0(k)$ represents an output voltage value at the sampling time k; $V_r(k)$ represents a reference voltage value corresponding to the $V_0(k)$ at the sampling time k; $V_0(k-1)$ represents an output voltage value at a sampling time k-1; and $V_r(k-1)$ represents a reference voltage value corresponding to the $V_0(k-1)$ at the sampling time k-1; setting a switching point threshold to be a threshold value $e_{max}$, and comparing $J_{sw}(k)$ with $e_{max}$; when $J_{sw}(k) > e_{max}$, the system is determined to be in a transient state; and when $J_{sw}(k) < e_{max}$, the system is determined to be in a steady state;
   (S5) according to the determining condition of step (S4), when the system is determined to be in the steady state, adopting the deadbeat control by an inner loop; when the system is determined to be in the transient state, adopting a finite control set model predictive control by the inner loop.

2. The switching type control method based on the double loop predictive control according to claim 1, wherein in (S1), according to Kirchhoff Voltage Law (KVL) and Kirchhoff Current Law (KCL), setting out the state equation of the discrete time of the system:

$$\begin{cases} \dfrac{d}{dt}\begin{bmatrix} V_0(k) \\ i_L(k) \end{bmatrix} = \begin{bmatrix} 0 & \dfrac{1}{C} \\ -\dfrac{1}{L} & 0 \end{bmatrix}\begin{bmatrix} V_0(k) \\ i_L(k) \end{bmatrix} + \begin{bmatrix} 0 & -\dfrac{1}{C} \\ \dfrac{1}{L} & 0 \end{bmatrix}\begin{bmatrix} V_{in}(k) \\ i_0(k) \end{bmatrix} \\ y_c(k) = \begin{bmatrix} 1 & 0 \end{bmatrix}\begin{bmatrix} V_0(k) \\ i_L(k) \end{bmatrix} \end{cases},$$

wherein d[ ]/dt represents a differential value of the state variable; L and C respectively represent a filter inductance value and a filter capacitance value of a single-phase voltage inverter; $V_0(k)$ and $i_L(k)$ respectively represent the output voltage value and an filter inductor current value of the single-phase voltage inverter at the sampling time k, and act as state variables of the system; $V_{in}(k)$ represents a voltage value at a AC side of an inverter bridge of the single-phase voltage inverter at the sampling time k, and acts as the disturbance variable of the system; $i_0(k)$ represents an output current value at the sampling time k, and acts as the disturbance variable of the system; and $y_c(k)$ represents a controlled output variable value at the sampling time k; setting a sampling period of the system to be T, and T is the sampling period of the system, discretize the state equation according to forward Euler method and obtain:

$$\begin{cases} \begin{bmatrix} \dfrac{V_0(k+1) - V_0(k)}{T} \\ \dfrac{i_L(k+1) - i_L(k)}{T} \end{bmatrix} = \begin{bmatrix} 0 & \dfrac{1}{C} \\ -\dfrac{1}{L} & 0 \end{bmatrix}\begin{bmatrix} V_0(k) \\ i_L(k) \end{bmatrix} + \begin{bmatrix} 0 & -\dfrac{1}{C} \\ \dfrac{1}{L} & 0 \end{bmatrix}\begin{bmatrix} V_{in}(k) \\ i_0(k) \end{bmatrix} \\ y_c(k) = \begin{bmatrix} 1 & 0 \end{bmatrix}\begin{bmatrix} V_0(k) \\ i_L(k) \end{bmatrix} \end{cases},$$

wherein $V_0(k+1)$, $i_L(k+1)$ respectively represent an output voltage value and the filter inductor current value at a sampling time k+1, and act as the state variables of the system; $V_0(k)$ and $i_L(k)$ respectively represent the output voltage value and the filter inductor current value of the single-phase voltage inverter at the sampling time k, and act as the state variables of the system; $V_{in}(k)$ represents the voltage value at the AC side of the inverter bridge at the sampling time k, and acts as the disturbance variable of the system; $i_0(k)$ represents the output current value at the sampling time k, and acts as the disturbance variable of the system; $y_c(k)$ represents the controlled output variable value at the sampling time k; L and C respectively represent the filter inductance value and the filter capacitance value of the single-phase voltage inverter; and T is the sampling period of the system.

3. The switching type control method based on the double loop predictive control according to claim 1, wherein in (S2), the state variables $V_0(k)$, $i_L(k)$, the controlling input variable $V_r(k)$, the controlled output variable $y_c(k)$ and the disturbance variables $V_{in}(k)$, $i_0(k)$ of the system are measured.

4. The switching type control method based on the double loop predictive control according to claim 1, wherein in (S3), adopting the deadbeat control by the outer loop control to improve the overall performance of the system; according to (S1), a discrete KCL equation of the system is obtained:

$$\dfrac{C}{T}[V_0(k+1) - V_0(k)] = i_L(k) - i_0(k),$$

and in combination with the principle of the deadbeat control: $V_r(k+1) - V_0(k+1) = 0$, wherein $V_0(k+1)$ represents an output voltage value at a sampling time k+1 and $V_r(k+1)$ represents a reference voltage value corresponding to the $V_0(k+1)$ at the sampling time k+1, then a calculation formula of the current inner loop control reference value is obtained:

$$i_r(k) = \dfrac{C}{T}[V_r(k+1) - V_0(k)] + i_0(k),$$

wherein $i_r(k)$ represents a reference current value of a filter inductor current $i_L(k)$ at the sampling time k; $V_r(k+1)$ represents the reference voltage value corresponding to the $V_0(k+1)$ at the sampling time k+1; $V_0(k)$ represents the output voltage value at the sampling time k; $i_0(k)$ represents an output current value at the sampling time k; C represents a filter capacitance value; and T represents a sampling period of the system.

5. The switching type control method based on the double loop predictive control according to claim 1, wherein in (S5), according to the determining condition of (S4), when the system is determined to be in the steady state, the deadbeat control is adopted by the inner loop control to reduce a steady state error of the system and to achieve a fixed switching frequency; and when the system is determined to be in the transient state, the finite control set model predictive control is adopted by the inner loop control to ensure a rapid transition of the system to the steady state.

* * * * *